May 16, 1944. P. A. WOLFF 2,349,228
WEIGHING DEVICE
Filed Feb. 25, 1942 2 Sheets-Sheet 2

Inventor

Paul A. Wolff

By Stevens and Davis
Attorneys

Patented May 16, 1944

2,349,228

UNITED STATES PATENT OFFICE 2,349,228

WEIGHING DEVICE

Paul A. Wolff, Hoboken, N. J., assignor to Well Surveys, Incorporated, Tulsa, Okla., a corporatioin of Delaware Application February 25, 1942, Serial No. 432,343

2 Claims. (Cl. 265—47)

This invention relates to a device for weighing a vertical suspended cable or the like and anything that may be attached to it. The invention is particularly applicable to the geological surveying of oil wells and the like, in which one or more exploring instruments are lowered down a well bore. In the operation of the processes and equipment commonly used in that art the additional utilization of the present invention gives the operator a chance to determine, continuously, if desired, the weight of the cable suspended in the hole. From this, the length of cable in the hole may be computed, and the bottom of the hole and the upper surface of any liquid in the hole, accurately located.

Since this invention is particularly applicable to well logging it will be described as applied thereto, although it may be applied in other fields.

The common practice in well logging is to lower into the well to be logged an instrument or instruments which are sensitive to a condition or conditions which change as the well bore passes through strata of varying nature. Such instruments may, for example, measure the resistance, the temperature, the thermal conductivity, the sound absorbing qualities, the radioactivity or the ability to absorb or reflect radioactive radiations, of the adjacent strata. Many such devices are already known to the art and in actual commercial use.

The measurements made by the instrument or instruments in the well are commonly carried to the surface and recorded in correlation with a recording of the depth at which the instrument is positioned when the measurement is made. By recording both the measurements and the changes in depth continuously a continuous curve or "well log" may be obtained.

Mechanically, the operation is usually performed by suspending the measuring instrument at the end of a cable containing at least one electrical conductor and passing vertically upward from the instrument out of the mouth of the well over a supporting wheel and then horizontally onto a power driven cable drum mounted on a motor truck. Electrical connections through the cable drum to recording equipment permit electrical signals indicative of the measurements being made by the instrument in the well to be brought to the surface and recorded.

The supporting wheel for the cable, which is positioned at the mouth of the well, is usually a grooved wheel of relatively large diameter, mounted on a frame which supports it but permits it to revolve freely. This frame is usually supported from the surface of the earth at least three points so that it will furnish a stable support for the supporting wheel. Further, the frame is fastened so that it cannot move horizontally.

According to the present invention the vertical component of the force exerted by the frame downward against the earth at at least one of its points of support is measure and from this measurement the total downward force exerted by the cable and the instrument or instruments suspended upon it is determined. This is accomplished by inserting an hydraulic bellows between at least one of the points of support of the frame, and the earth, and measuring the pressure developed within the bellows. This measurement may be made at the well, the force may be transmitted to a point some distance from the well and measured, or the force may be converted into an electrical signal and the electrical signal transmitted to a distant point to give an indication of the force being measured. Further, if desired, the downward force may be measured at a plurality or even all of the points where the frame is supported from the surface of the earth and these measurements may be made separately, or may be combined by adding or averaging.

The resultant measurements may be either observed visually or may be recorded and if recorded may be recorded continuously in correlation with either time or the length of cable payed out so as to give a continuous curve, the variations of which will indicate the conditions encountered by the instrument at the lower end of the cable. For example, if the instrument at the lower end of the cable strikes liquid in the well, the rate of increase in weight will be less thereafter because the instrument will lose a weight equal to that of the displaced liquid. Also, when the instrument strikes the bottom of the well the rate of increase in weight will thereafter be less because the instrument and perhaps part of the cable will be supported from the bottom of the well. As a matter of fact, when the instrument strikes liquid or the bottom of the well the weight indicated may even decrease for a short time until the amount of additional cable payed into the well offsets the amount of weight supported by the liquid or the bottom of the well. Thus, the indications obtained tell not only the amount of cable in the well but something of the condition and depth of the well.

For a more complete understanding of the details and advantages of this invention reference may be had to the appended drawings in which is illustrated the preferred embodiment of the present invention.

In the drawings:

Figure 4 is a detailed illustration of a method of connecting two or more pressure gauges so as to combine their indications.

Figure 1:
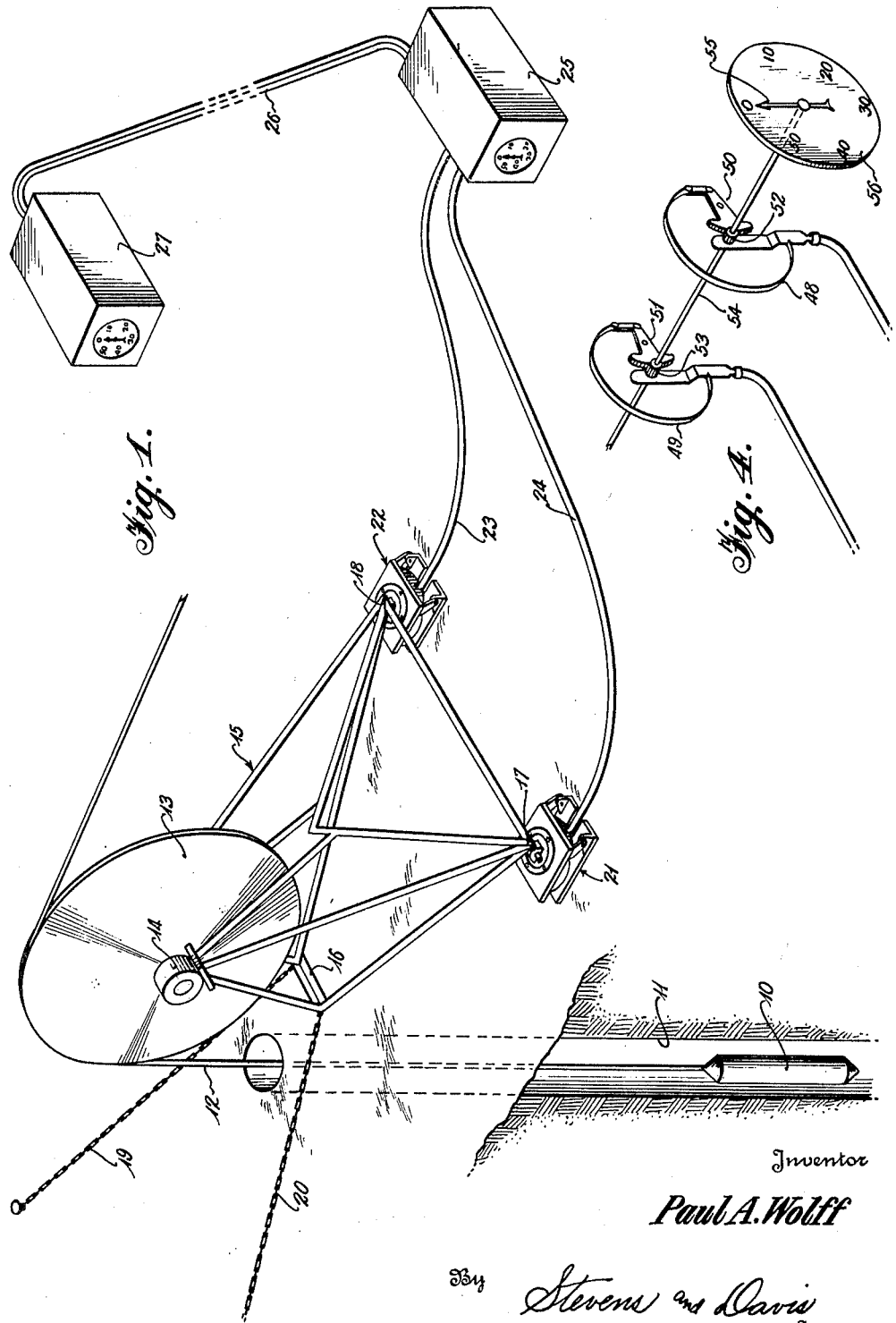
Figure 1 is a diagrammatic illustration of the application of this invention to well logging.
Figure 2:
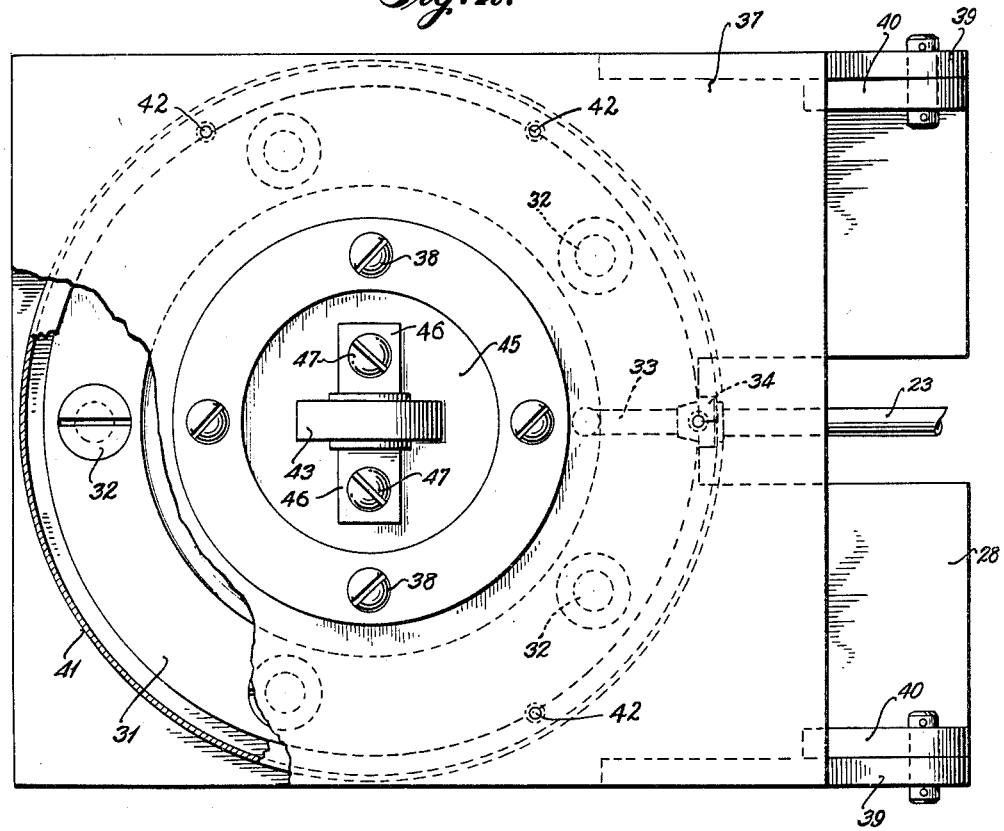
Figures 2 and 3 are plan and vertical sectional views respectively of the hydraulic bellows that is placed between the supporting frame and the surface of the earth.
Figure 3:
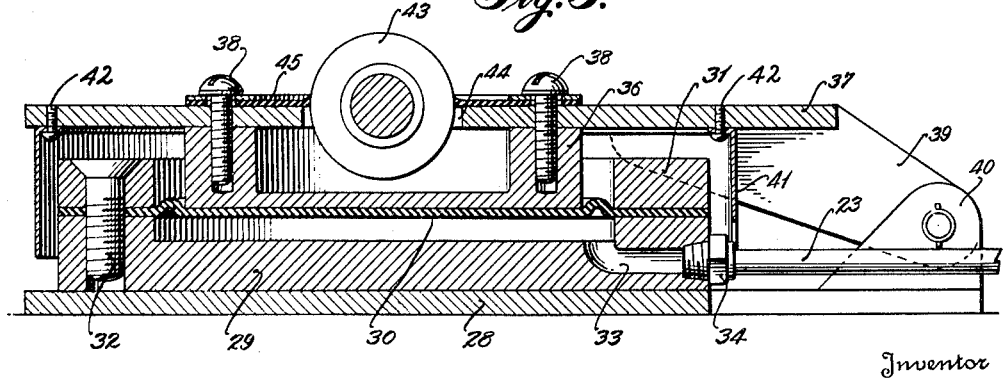

As illustrated in Figure 1, a surveying instrument 10 such, for example, as the one described in United States Letters Patent No. 2,219,274 granted Serge A. Scherbatskoy on October 22, 1940, is suspended in a well bore 11 by a cable 12 which passes upward and over a supporting wheel 13 and then in a substantially horizontal direction to a power driven cable reel not shown. The supporting wheel 13 is supported in bearings 14 by a frame generally designated 15 which itself is supported at the surface of the earth at the edge 16 which is near the mouth of the well and at the corners 17 and 18 which are further away from the mouth of the well. Chains 19 and 20 fastened to the frame at the edge 16 are anchored at the surface of the earth by means not shown and serve to hold the wheel and the frame in the proper position. This wheel and supporting frame are described in greater detail in applicant's United States Letters Patent No. 2,301,001 which issued November 3, 1942.

Under the corners 17 and 18 of the frame are positioned hydraulic bellows 21 and 22 respectively, so that the downward component of force that results from the attempt of the frame to pivot about the fulcrum formed by the support for the edge 16 of the frame presses upon the bellows 21 and 22 to an extent dependent upon the downward pull of the cable and the instrument in the well.

The hydrostatic pressure generated in these bellows 21 and 22 is transmitted through tubes 23 and 24 respectively to a unit 25 which houses a pressure gauge arrangement that gives an indication of the average pressure in the two bellows. This same unit 25 may also contain an electrical generator for generating a signal indicative of the reading of the pressure gauge arrangement. This signal may be transmitted by wires 26 to a remote indicating device 27 which indicates at that point, the measurement made by the pressure gauge in the unit 25. For the purpose of transmitting this indication it has been found convenient to use the well-known "Selsyn" electrical transmission system. The indications of pressure may, if desired, be continuously recorded during the well logging operation, either by a separate recorder or by the recorder that records the well log.

While, as shown, there are two hydraulic bellows, one under each of the two corners 17 and 18 of the frame 15 it is to be understood that a slightly less accurate indication could be obtained by using only a single bellows under one of the two corners. This would be satisfactory for most purposes, but if greater accuracy is desired, two hydraulic bellows may be used, as has been shown. A third hydraulic bellows may be placed under the edge 16 of the frame 15, if desired, but this is usually neither necessary nor desirable.

In the preferred embodiment each of the hydraulic bellows comprises a base plate 28 which rests upon the earth or some other firm foundation. Upon this base plate is mounted a cup shaped member 29 covered by a diaphragm 30 which is held in place by a ring or annulus 31 fastened into position by machine screws 32 which pass through it and into the cup shaped member. The space beneath the diaphragm is filled with a liquid such as oil or water and connected through an opening 33 in the cup shaped member 29 and a nipple 34 to the pressure hose 23 which connects it to the pressure gauge in the unit 25.

The downward pressure from the frame 15 is brought to bear upon the diaphragm 30 through a plunger 36 which is fastened to a main pressure plate 37 by machine screws 38. Lugs 39 on the main pressure plate 37 are pivotally connected to lugs 40 on the base plate 28 so that the main pressure plate and the base plate may move vertically toward or away from each other but may not otherwise be displaced with respect to each other.

A skirt shaped member 41 is mounted on the main pressure plate 37 by machine screws 42 and extends downward around the cup shaped member 29 so as to prevent dirt or other foreign material from reaching the diaphragm. A roller 43 is mounted on a horizontal axis in an opening 44 in the top of the pressure plate 37 and it is upon the periphery of this roller that the frame 15 rests. Thus, the frame 15 is free to roll in a horizontal position across the hydraulic bellows and only the vertical component of the force present therein is transmitted to the bellows.

A piece of flexible material such as leather or felt 45 may be arranged to surround the roller 43 at the point at which it passes into the opening 44 so as to prevent foreign materials from entering the opening and restricting the free movement of the roller. This material may be held underneath the heads of the machine screws 38 already mentioned. The shaft which supports the roller 43, being parallel to the surface of the main pressure plate 37, may be cut away so as to have flat portions 46 which will lie flat on the face of the pressure plate and may be secured to the pressure plate by bolts 47.

While numerous other constructions may easily be devised for the pressure bellows of this invention, the particular construction above described is highly desirable because it is rugged and well protected against the dirt and other refuse that it is likely to encounter in field use.

As illustrated in Figure 4 the pressure developed by the two hydraulic bellows may be combined into a single reading by the use of two Bourdon tubes of the type usually found in pressure gauges by connecting the two Bourdon tubes to a single shaft through the usual gearing found in pressure gauges. Thus the pressure from the hydraulic bellows 21 may be introduced into a Bourdon tube 48 and that from the hydraulic bellows 22 may be introduced into a Bourdon tube 49. The expansion of the Bourdon tubes will as is customary cause arms 50 and 51 respectively to pivot and these arms, which as usual each carry a gear segment, will each tend to actuate its corresponding pinion 52 or 53. By mounting these two pinions 52 and 53 on the same shaft 54 the shaft will be rotated to an extent indicative of the average pressure in the two Bourdon tubes. Thus if a pointer 55 is placed on the shaft and arranged to register on a dial 56 the pressure registered will be the average pressure in the two hydraulic bellows. Further, by connecting this shaft to a "Selsyn" generator a signal indicative of the average pressure may be sent to a remote point.

One of the important advantages of the present invention is that it permits the measurement of the weight of the cable and attached instrument in the well to be made without great alteration in the present type of well logging equipment. In this type of well logging equipment the cable usually comes vertically to the surface and then passes horizontally to the cable truck. The supporting wheel is therefore subject to both vertical and horizontal forces and it is desirable to measure only the vertical component of this force. Further, by using the point of support of the frame which is nearest to the hole as a fulcrum and placing one or more hydraulic bellows under the supporting points further from the hole, only a part of the total weight of the cable and instrument is placed on the bellows. This permits the bellows to be less strongly constructed and the pressure hoses and pressure gauges to be designed for lighter pressures.

Numerous minor modifications in the structural details of the device described may be made by those skilled in the art and hence it is to be understood that the scope of this invention is not limited to the particular embodiment described.

I claim:

1. In a force measuring device adapted for use in measuring the downward pull of the suspended portion of a cable in a drill hole and anything that may be attached to it wherein the cable passes over a wheel carried by a frame, the improvement which comprises force responsive means for supporting the frame at at least one point to respond to the downward component of force exerted by the frame at said point, said means comprising a base, means carried by said base defining a chamber in the top face thereof, a diaphragm forming a closure for said chamber, a fluid in said chamber, a remotely positioned pressure indicator, means defining a passageway connecting said chamber to said remotely positioned pressure indicator whereby change in pressure of the fluid in the chamber can be communicated to the indicator, means pivotally secured at one side to said base and floatingly supported by said diaphragm for engaging the frame whereby changes in downward force exerted on the frame will produce changes in pressure on the fluid in the chamber which will be indicated by the indicator.

2. A force measuring device adapted for use in measuring the downward pull of the suspended portion of a cable in a drill hole and anything that may be attached to it wherein the cable passes over a wheel carried by a frame, the improvement which comprises a plurality of force responsive means for supporting the frame at a plurality of points to respond to the downward components of force exerted by the frame at said points, each of said means comprising a base, means carried by said base defining a chamber in the top face thereof, a diaphragm forming a closure for said chamber, a fluid in said chamber, a remotely positioned pressure indicator, means defining a passageway connecting said chamber to said remotely positioned pressure indicator whereby change in pressure of the fluid in the chamber can be communicated to the indicator, means pivotally secured at one side to said base and floatingly supported by said diaphragm for engaging the frame, whereby changes in downward force exerted on the frame will produce changes in pressure on the fluid in the chamber which will be indicated by the indicator.

PAUL A. WOLFF.